United States Patent [19]

Saidla

[11] 4,405,538

[45] * Sep. 20, 1983

[54] RESIN TRANSFER MOLDING SYSTEM WITH CONTROLLED INDUCTION PERIOD FOR EXPANDED SYNTHETIC ARTICLES

[75] Inventor: Glen W. Saidla, Stratham, N.H.

[73] Assignee: Whitney & Company, Inc., Stratham, N.H.

[*] Notice: The portion of the term of this patent subsequent to Nov. 9, 1999, has been disclaimed.

[21] Appl. No.: 291,315

[22] Filed: Aug. 10, 1981

Related U.S. Application Data

[63] Continuation-in-part of Ser. No. 111,664, Jan. 14, 1980, Pat. No. 4,358,548.

[51] Int. Cl.³ .............................................. B29D 27/00
[52] U.S. Cl. .................................. 264/45.5; 264/46.7; 264/54; 264/DIG. 5; 264/DIG. 83; 428/304.4; 521/94; 521/96; 521/99; 521/122; 521/128; 521/137
[58] Field of Search ............. 264/45.3, DIG. 83, 45.5, 264/54, DIG. 5, 46.7; 521/94, 96, 99, 110, 122, 128, 137; 428/304.4

[56] References Cited

U.S. PATENT DOCUMENTS

| | | | |
|---|---|---|---|
| 3,823,099 | 7/1974 | Doyle | 521/99 X |
| 3,970,732 | 7/1976 | Slaats et al. | 264/DIG. 83 |
| 4,073,840 | 2/1978 | Saidla | 264/45.3 X |
| 4,211,848 | 7/1980 | Blount | 521/99 X |
| 4,216,294 | 8/1980 | Halle et al. | 521/99 |
| 4,308,226 | 12/1981 | Wingard | 264/45.3 |
| 4,314,036 | 2/1982 | Throne et al. | 521/99 |

Primary Examiner—Philip E. Anderson

[57] ABSTRACT

A method of forming synthetic articles of polyester resin by resin transfer molding techniques or the like comprising combining a set of reactants including a major base mass of polyester resin in fluid form, at least one polyester cure accelerator, a selected quantity of isocyanate, a surfactant and at least one promoter. The isocyanate is added in sufficient quantity to react with at least one other component in the mixture to produce quantities of carbon dioxide throughout the mixture. The resultant mixture is transferred into a closed mold prior to substantial reaction. The promoter is allowed to react exothermically with at least one other component of the mixture to trigger the isocyanate to react to evolve carbon dioxide gas to generate pressure to fill the mold. Thereafter a curing reaction between the cure accelerator and the polyester occurs to cure and solidify the expanded resin to produce an expanded article. Preferably reinforcement is placed within the mold prior to filling, the expansion of the mixture is effective to bring the fluid resin into pressured wetting contact with substantial regions of the surface of the reinforcement to incorporate the element within the resin by self working or gradual flow within the closed mold, and curing the expanded resin produces a reinforced expanded article.

8 Claims, 6 Drawing Figures

RESIN TRANSFER MOLDING SYSTEM WITH CONTROLLED INDUCTION PERIOD FOR EXPANDED SYNTHETIC ARTICLES

This application is a continuation-in-part of application Ser. No. 111,664, filed Jan. 14, 1980 U.S. Pat. No. 4,358,548.

FIELD OF THE INVENTION

This invention relates to forming synthetic reinforced articles by resin transfer molding techniques and the like.

BACKGROUND OF THE INVENTION

Reinforced synthetic articles may be formed by resin transfer molding (RTM) techniques or the like by providing a mixture comprised primarily of fluid polyester resin to be transferred into a closed mold containing reinforcement elements where the mixture wets the reinforcement before curing.

Resin transfer molding is an intermediate molding process, i.e. a process between open molding techniques and reaction injection molding (RIM) techniques, which employs low pressure, lower cost equipment with male and female molds to produce high tolerance parts (with two smooth surfaces) at an intermediate rate. Examples of articles suitable for production by RTM processes include: automobile and van body components, bathtub/shower units, fire helmets, utility boats, skateboards, chemical tank covers and business machine enclosures.

Expanded resin transfer molding (ERTM) employs a gas forming reaction within the mold to generate pressure to expand the base resin mass to fill the mold.

In systems using chemical generation of the gas that expands the resin, it is desirable to have a simple, reproducible gas generation reaction which does not require external addition of heat and which does not interfere with the properties of the end product. Ideally, an ERTM process employing a chemical gas generating system would be inexpensive and require inexpensive equipment, would utilize components that are nontoxic, would be capable of achieving a full range of expanded article densities, and would permit a limited period after mixing to allow the fluid resin to come into pressurized wetting contact with the surface of the reinforcement elements before curing in the expanded state thereby wetting the reinforcing elements therein. This "self working" contact between the resin and the reinforcing elements causes the resin to wet the fibres and remove air from the deposited mass.

Finally, it is desirable that such gas-generating components be capable of functioning over a non-critical range of proportions without harming or altering the composition of the product. Unfortunately, to date, for many resin systems, the previously known expansion agents are inadequate in a number of these respects.

For example, in certain known urethane and polyester expansion producing reactions, the ingredients must be combined stoichiometrically within a critical ratio of 1%. This has caused known systems to employ accurate and expensive pumps, e.g. gear pumps, to deliver the ingredients at a smooth, precise and constant flow rate.

Furthermore, these known foaming reactions occur so quickly that it is not possible to wet the reinforcing fibres within the mold or to force out the air or produce a shrink resistant product that is cured in the expanded state. These systems are therefore not generally useful in producting expanded articles by RTM processes.

SUMMARY OF THE INVENTION

According to the invention, a method of forming a synthetic article of polyester resin by resin transfer molding techniques or the like comprises combining a set of reactants which include a major base mass of polyester resin in fluid form, at least one polyester cure accelerator, a selected quantity of isocyanate, a surfactant and at least one promoter, the isocyanate being present in sufficient quantity to react with at least one component of the set to produce quantities of carbon dioxide throughout the mixture, closing the mold, transferring the resulting mixture into the closed mold prior to substantial reaction, allowing the promoter to react exothermically with at least one component of the set to trigger the isocyanate to react to evolve carbon dioxide gas to generate pressure to expand the mixture to fill the mold thereafter initiating a curing reaction between the cure accelerator and the polyester to cure and solidify said expanded resin. Preferably reinforcement is placed within the mold prior to filling, the expansion of the mixture is effective to bring the fluid resin into pressured wetting contact with substantial regions of the surface of the reinforcement to incorporate the element within the resin by self working within the closed mold a reinforced expanded article.

In preferred embodiments, the polyester cure accelerator is also reactive with the isocyanate in the presence of heat and the isocyanate is present in sufficient quantity to react with the accelerator to provide mold filling and shrink-resistant quantities of carbon dioxide throughout the mixture, preferably the proportions of all ingredients in the mixture are predetermined to assure that the preponderant quantity of $CO_2$ produced from the isocyanate results from this reaction, more preferably the polyester cure accelerator is an organic hydroperoxide, and more preferably the organic hydroperoxide is methyl ethyl ketone peroxide; the promoter is exothermically reactive with the isocyanate and the exothermic reaction between the promoter and a portion of the isocyanate produces heat effective to trigger the gas forming reaction, preferably the additive is a potassium compound; the method includes enabling the interior of a layer of resin to rise to a higher temperature level than an outer surface of the layer in a manner to cause formation of more cells of larger volume in the interior relative to the outer portion prior to the cure whereby a variable density reinforced article is produced having lower density in the region of the neutral axis of the layer and higher density in the outward region while the reinforcement element is wetted within the resin; and the presence of water and hydrogen peroxide in the composition is limited to a weight ratio of the order of 1:25 of water and hydrogen peroxide to active components in the organic hydroperoxide to thereby cause the gas expansion to form the expanded article with a substantially nonporous exterior surface, preferably at least one surface of the expanded article has a Class A finish.

PREFERRED EMBODIMENTS

The structure and operation of a preferred embodiment of the invention will now be described, after first briefly describing the drawings.

FIG. 3 is a side view, partially in section, of a polyester article produced according to the invention, while

PROCESS

Figure 1:
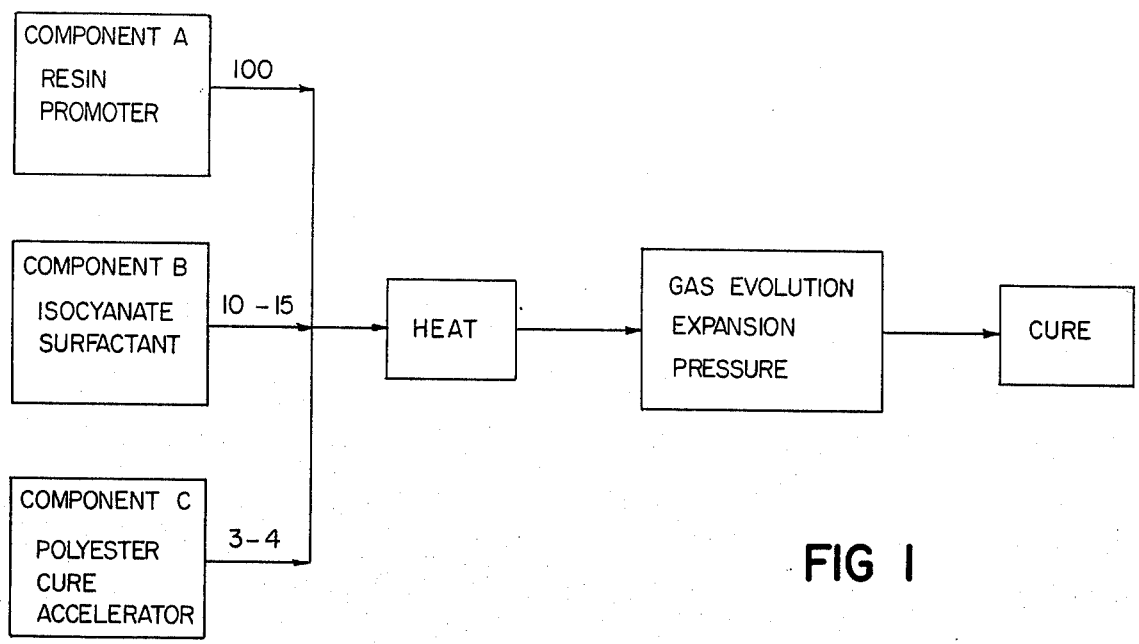
FIG. 1 is a flow diagram of the resin expanding system.

Referring now to FIG. 1, the product components are prepared separately for mixing immediately prior to injection into the mold cavity. The primary component, Component A, consists of the base mass of polyester resin to which is added a promoter, e.g. metal compounds, e.g cobalt napthanate or potassium compounds, which are included in many standard resins as a processing aids; such are nonreactive with the resin but are exothermically reactive with at least one of the other reactants.

Component B is comprised of a mixture of an organic isocyanate and a low hydroxyl surfactant nonreactive with the isocyanate, which is used to control the size and size distribution of cell-forming bubbles by adjusting surface tension.

Component C is a polyester cure accelerator reactive with the polyester resin to bring about gellation and cure with the actual ratio dependent upon the resin employed.

The three component mixtures A, B and C are combined in a ratio of 100:5-20:1-6 respectively, by weight, with the actual ratio dependent upon the resin employed. The promoter present in Component A reacts with another component in the mixture to generate heat, which in turn triggers the isocyanate gas-evolving reaction to generate pressure within the base means of polyester resin to cause the resin to expand, and subsequently to cure in the expanded state.

As previously mentioned, resin transfer molding is an intermediate molding process, i.e. a process between open molding techniques (which generally employ skilled labor to produce a limited number of individually crafted parts in open molds (typically 2 hours per part for a forty pound automobile roof)) and reaction injection molding techniques (which generally employ highly complex equipment to produce highly uniform parts at a very rapid rate from high pressure molds (typically 3 minutes for the same forty pound part)). Resin transfer molding employs low cost closed mold equipment, i.e. low pressure pumps and molds, to produce high tolerance parts at an intermediate rate. RTM also requires less skilled labor and produces articles with two finished surfaces.

Figure 2:
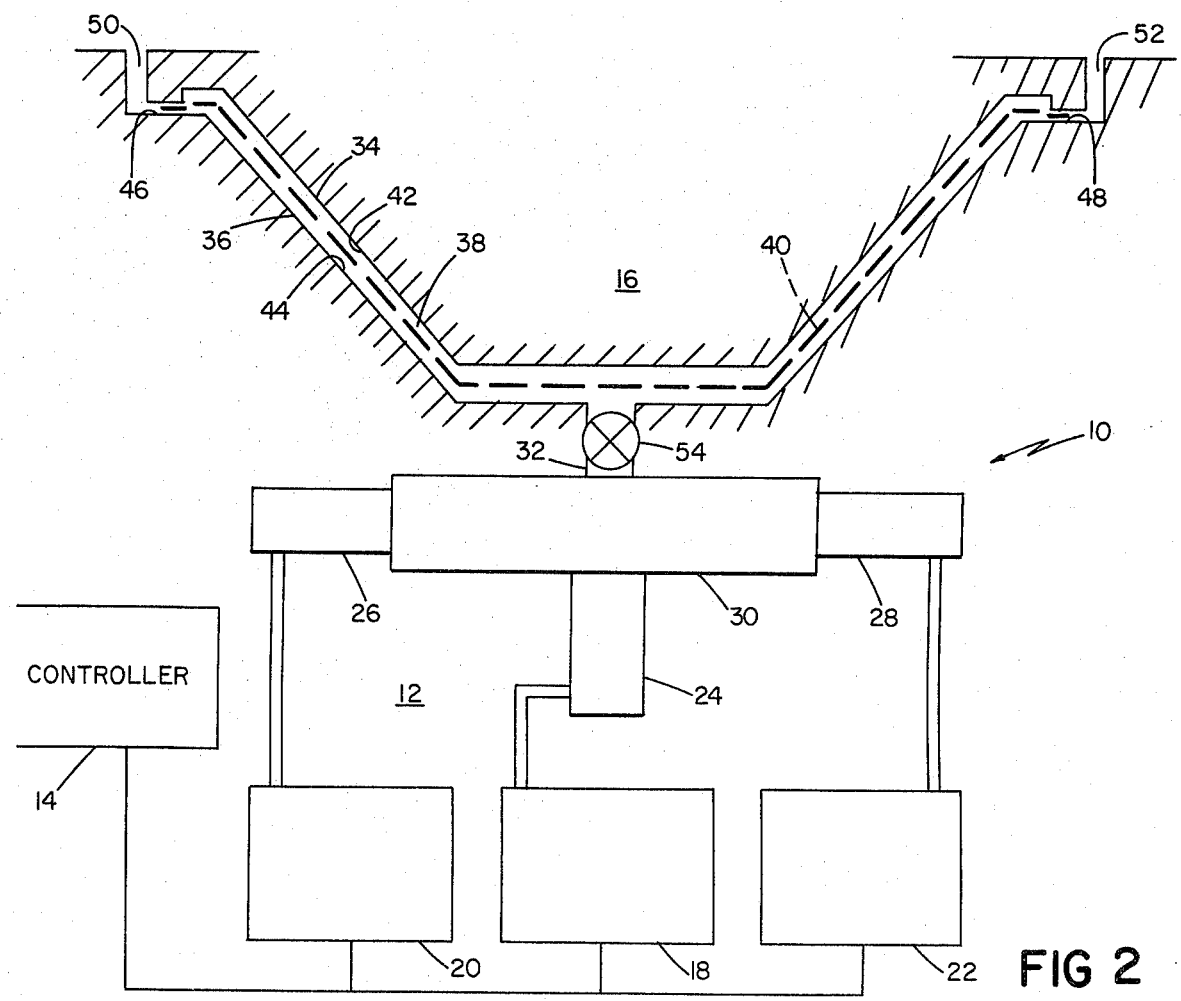
FIG. 2 is a diagrammatic view of a resin transfer molding apparatus.

Referring now to FIG. 2, there is shown a diagrammatic representation of a typical resin transfer molding process apparatus 10, e.g. of the type supplied by Liquid Control Corp., of North Canton, Ohio, comprised of material feed and mixing system 12 (including controller 14) and mold 16. The material feed system includes separate supply tanks 18, 20, 22 for each ingredient, and separate metering pumps 24, 26, 28, typically 300-400 psi head, versus 2000 psi head required for RIM processing equipment. The size of the mixture shot and the relative proportion of each material per shot are predetermined by means of controller 14. The feeds from the metering pumps are combined in static mixer 30 and fed into mold 16. The mold is comprised of male and female sections 34, 36 which fit together to form mold cavity 38 to receive the combined ingredients. A reinforcing element 40, e.g. continuous strand mat, woven roving, preformed mat, chopped strand mat, or cloth; may be placed into mold cavity 38 before the male 34 and female 36 sections are joined and clamped. The product surfaces 42, 44 of either or both mold sections 34, 36 may also be prepared with a gel coat, if this is the desired product finish, by spraying the mold surface with resin and then curing. Pinch off areas 46, 48 are provided at mold high points to allow venting 50, 52 of air from the mold during the process to ensure mold filling.

Components A, B and C (resin, isocyanate, and accelerator, respectively) are connected to individual meter pumps 24, 26, 28 respectively. The reinforcing element 40 is placed into the mold cavity 38, and the male mold segment 34, which has been gel coated (58, FIG. 3), and the female segment 36 are joined and clamped. The controller 14 is preset for the proper shot size (the shot is typically sized to fill the mold cavity to approximately 50 percent capacity or to full capacity where high density, high tolerance parts are to be produced without shrinkage, e.g. microwave antennas or chemical resistance floor grating) and proportions, e.g. 100 grams of Component A, 15 grams of Component B, and 4 grams of Component C, and meter pumps 24, 26, 28 are activated to simultaneously meter the components through the static mixer 30 and into the mold cavity 38 via sprue 32, typically at a rate of 5-30 lb./min., versus 100-300 lbs/min. for RIM. Advantageously, the system provides for delayed gas evolution, typically one minute, or substantially more for complex or thick parts, which allows time for pumping the mixture into the mold as well as time for wetting out the reinforcement during this liquid phase.

Valve 54 in sprue 32 then closes, and the mixer 30 is cycled through a solvent flush cycle to remove any remaining reactants from the mixer.

In the mold cavity 38, the promoter reacts with one of the other components in the mixture to generate heat within the mixture. The rising temperature subsequently triggers the isocyanate gas-evolving reaction, typically at 95° F., as measured in a 50 gram cup, which causes the base resin mass to expand quickly within cavity 38. This expansion forces substantially all of the air out of the mold cavity. When resin starts to leak from vents 50, 52 they are closed. The expansion then generates pressure, typically of the order of up to 50 psi, within the mold which brings the fluid foam into pressurized contact with substantially all the surface of reinforcing element 40. This generated pressure in the fluid state causes self-working within the closed cavity to force air out of the reinforcing element and bring out some wetting contact. When the resin subsequently gels in the expanded state, this wetting contact with the reinforcing element imparts some additional strength properties in the finished article.

The mold is then unclamped, and the article is removed.

Figure 3B:
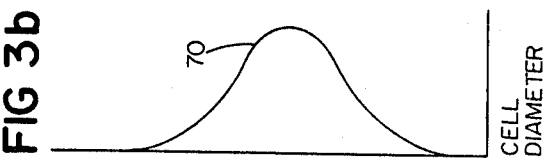
FIG. 3a and 3b are representative profiles of the apparent density, and the average cell diameter respectively taken across the cross section of FIG. 3.
Figure 3A:
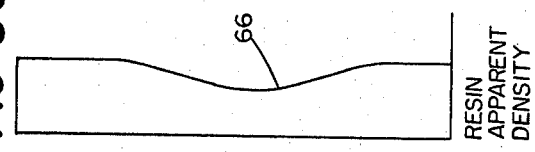
Figure 3:
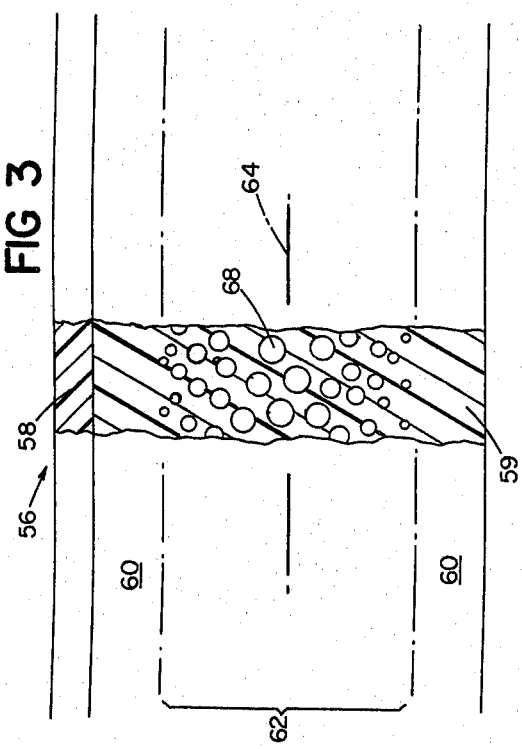

Referring to FIG. 3, the cured article 56 with gel coat 58, typically 0.020 inch thick, corresponding to the male mold surface 42 is shown in cross section. The cured, expanded polyester 59, typically 0.250 inch thick, at the product 56 is comprised of skin 60 at both surfaces, i.e. formed against the female mold surface and the gel coat 58, typically 0.040 inch thick, where little or no gas formation occurs, and the expanded center segment 62, typically 0.170 inch thick. The article 56 has differential apparent density (66, FIG. 3a) over the cross section, with the lowest apparent density along the neutral axis 64 through the center of laminate product 56. This density profile is caused by differential temperature within the material during the expansion process, the higher temperatures along neutral axis 64 causing the gas generation to initiate along the axis and thereby create larger gas bubbles 68, as shown in curve 70, FIG. 3b.

The Gas Generating Reaction

In the preferred system, the gas generating reaction occurs between the organic isocyanate and the polyester cure accelerator, an organic hydroperoxide, to produce carbon dioxide and a resinous residue. The residue is identified as an amine oxide polymer, from the following reaction that is believed to occur:

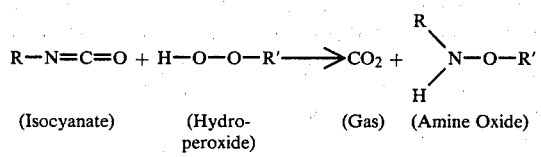

| (Isocyanate) | (Hydro-peroxide) | (Gas) | (Amine Oxide) |

Examples of suitable isocyanates are aromatic isocyanates, (and isocyanates having a reactivity comparable to aromatic isocyanates e.g. aliphatic isocyanates, e.g. Mobay's ethylene bis(4-cyclohexol isocyanate)), including monoisocyanates, e.g. n-butyl isocyanate, phenyl isocyanate, which are less desirable due to handling requirements of these highly reactive materials; diisocyanates, e.g. tolylene diisocyanates, diphenyl methane diisocyanates (methyl diphenyl isocyanate or "MDI"), napthalene diisocyanates, phenylene diisocyanates; triisocyanates, e.g. triphenylmethane triisocyanates; and polymeric polyisocyanates. Suitable hydroperoxides include alkyl hydroperoxides such as cumene hydroperoxide and butanone hydroperoxide (methyl ethyl ketone peroxide or "MEKP"). Both reactants may be present as a monomer or as various polymeric homologues. When difunctional reactants are used (e.g. MDI or MEKP), one or both of the functional groups of each reactant may participate in the reaction, depending, for example, on stearic hindrance present in the molecule.

The reaction evolving substantial volumes of carbon dioxide gas is preceeded by limited period of induction required to develop sufficient exothermic temperature within the resinous mass to trigger the isocyanate/organic hydroperoxide reaction. In the preferred system, two promoters are present with the resin in Component A. The primary promoter, which reacts to generate heat to trigger the gas-evolving reaction is a potassium compound, e.g. potassium octoate, employed as a 15 percent solution at a rate of the order of 0.75 percent of the base resin, by weight. The secondary promoter is a resin processing aid, e.g. cobalt napthanate, employed as a 6 percent solution at a rate of the order of 0.1 percent of the base resin, by weight. The potassium compound reacts quickly with the organic isocyanate to generate heat in the base resin mass, the cobalt napthanate reacts more slowly with the hydroperoxide, also generating heat. An exothermic temperature of 95° F. (measured in a fifty gram cup) is achieved after a period of induction of the order of two minutes and substantial gas evolution occurs. The organic hydroperoxide and the organic isocyanate also react exothermically during the period of induction, but slowly but no noticeable gas evolution.)

The gas evolving reaction is significantly exothermic with the exothermic temperature of the mixture rising during gas evolution to the order of 140° F., which causes the polyester cure accelerator, i.e. the organic hydroperoxide, to cure the resin in the expanded state.

Example of the Gas Generating Reaction

In order to provide an example of the gas generating capability of the two components, a series of reactions was observed using different weight ratios of the components. The specific isocyanate reactant used was a commercial MDI agent comprising MDI monomer and higher polymeric homologues (Mondur MR, from Mobay Chemical Co., Pittsburgh, PA.). The hydroperoxide reactant used was a commercial MEKP agent comprising a 60 percent solution of MEKP and higher polymeric homologues in an inert solvent, dimethyl pthalate (DDM from the Lucidol division of Pennwalt Corp., King of Prussia, PA.).

For each experiment, the two reactants were weighed into a small cup and mixed together at room temperature (about 68° F.) and ambient pressure for about 30 seconds. (The reaction between MDI and MEKP proceeds much more slowly in a resin solution. Due to the dilution effect of the resin, the reaction does not occur for up to the order of thirty minutes, with no noticeable gas evolution during this delay period.) The resulting reaction was significantly exothermic. The evolved gas was then measured, as summarized in the following table:

TABLE 1

| Ratio of Weight of MDI Agent to MEKP Agent | ml of Gas per Gram of Mixture |
|---|---|
| 0.10 | 4.9 ml/g |
| 0.19 | 115.0 ml/g |
| 0.48 | 111.0 ml/g |
| 0.91 | 58.3 ml/g |
| 1.67 | 55.4 ml/g |
| 3.13 | 48.4 ml/g |
| 6.69 | 14.1 ml/g |
| 9.65 | 3.3 ml/g |

Figure 4:
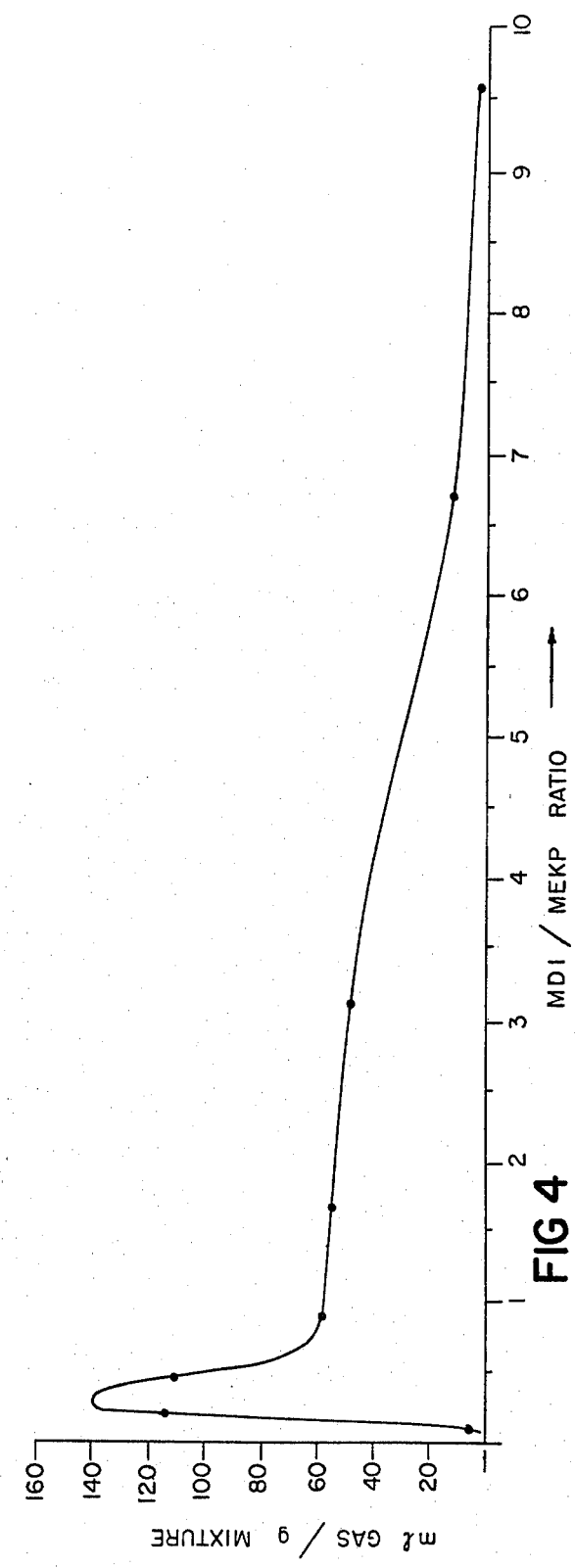
FIG. 4 is a curve depicting gas evolution from the reaction of various ratios of organic isocyanate and organic hydroperoxide.

Those results are summarized in the graph of FIG. 4, showing that the gas evolved per gram of mixture peaks at about 140 ml/g mixture at an MDI to MEKP agent weight ratio between about 0.25 and 0.30. (When the weights used are corrected to remove the solvent weight, the maximum amount of gas evolved by the reactants increases to about 180 ml/g corrected mixture, which is within the range theoretically predicted by the above reaction.) The above gas generating reaction is advantageously used to expand various resins, esp. polyester resins. The gas generated can be controlled to produce a wide range of densities of products. Additionally, the reaction can be used to produce a resinous product of microcellular composition that does not shrink during curing. Because the resultant cell structure can be strong (and strengthened by the amine oxide reaction product) the reaction can be employed to extend resins in high density applications, e.g. 30 lbs/ft³ to 60 lbs/ft³, and thus can supplant use of special extenders such as preformed glass spheres added to resin.

Use of the Gas Generating Reaction In An Unsaturated Polyester Resin System

Component A (unsaturated polyester resin) may be prepared by the condensation of an unsaturated dicarboxylic acid, such as maleic or fumaric acid, with a glycol or mixture of glycols, such as ethylene glycol; propylene glycol; 1, 4-butanediol; 1,6-hexandiol; or diethylene glycol. Saturated acids, for example phthalic acid, sebacic acid, or adipic acid, are sometimes included in the composition to reduce the amount of unsaturation in the final product, making it more flexible and tougher. In many instances it is desirable to use a polyester resin which is substantially free of hydroxyl groups or carboxyl groups; that is, the resin has a hydroxyl number of less than 15, preferably less than 10 and most preferably substantially zero, and an acid (carboxyl) number of less than 15, preferably less than 10, and most preferably substantially zero, but higher hydroxyl and/or higher carboxyl resins are operable, according to the invention, because all components are mixed together simultaneously and immediately dispersed. In such cases a polyisocyanate may be used, and the final product may contain amide, urea or urethane linkages. In the case of a polyester base resin, the resulting product may be a polyester urethane.

There is customarily added to the unsaturated polyester resin a vinylic monomer. This vinylic monomer serves as a solvent or diluent for the unsaturated polyester resin and as a comonomer therefor. Such vinylic monomers are usually referred to as cross-linking agents for the unsaturated polyester resin. Examples of such cross-linking monomers are styrene and dialkyl phthalate.

Also added to the resin are one or more promoters, e.g. cobalt napthanate or potassium octate, reactive with other reactants or promoting other reactions within the resin transfer molding system.

Component B is a mixture of the reactive isocyanate and a surfactant. The surfactant, which is used to control the size and size distribution of cell-forming bubbles, can be any suitable agent (preferably non-ionic) that adjusts the surface tension to promote the desired cell formation when hydroperoxide is reacted with the isocyanate. To make a commercially available premixed expansion agent, a low hydroxyl surfactant, non-reactive with isocyanate is prepared, with ratio of isocyanate to surfactant between about 95 to 5 down to 85 to 15, respectively, by weight. Preferably a silicone such as a polyoxyalkylene polysiloxane polymer is employed. (Such premixed expansion agent has a long shelf life.)

Component C (the organic hydroperoxide) is added in substantial excess over that which may be consumed in cross-linking or curing of the polyester resin. (Typically ¾ to 2 percent of the dilute hydroperoxide, relative to weight of the base resin, is used for curing; generally a larger fraction of the added hydroperoxide will be employed in the isocyanate reaction than in the curing action.)

Advantageously, the foaming system does not interfere with curing of the resin, the system is simple and can be used with conventional equipment, and no special temperature or handling is required to avoid explosions, toxic effects or degradation.

The resulting product has the advantageous properties of a polyester resin, and the product can be made essentially free of amide, urea or urethane linkages (e.g. by appropriately limiting the hydroxyl and carboxyl content of the resin used). As will be apparent from the following examples, the foaming reaction is useful over an extremely wide range of product densities.

EXAMPLES

The following examples of manufacturing unsaturated polyester resin articles by resin transfer molding were observed using MDI (isocyanate) and MEKP (hydro-peroxide).

EXAMPLE A

Component A was Freeman Chemicals XP40-A173 polyester resin to which 0.75 percent, by weight of the resin, of a 15 percent, potassium octoate promoter and 0.3 percent, by weight of the resin, of a 6 percent cobalt napthanate promoter were added. Component B was present as a mixture of 95 percent of the commercial MDI product mentioned above (Mobay's Mondur MR) and 5 percent surfactant (L-5340, a silicone surfactant from Union Carbide Co.). Component C was MEKP (Lucidol DDM/9) provided in a 50 percent solution with about 0.7% water and 0.7% hydrogen peroxide, by weight. The three components were prepared and separately provided to a resin transfer molding apparatus. The mold, containing a mat of continuous fibres and a cured gel coat on the male mold surface, was closed and clamped. The controller was set to inject the components into the mixing head in a weight ratio of 100:15:4 (Component A:Component B:Component C) in a ten pount shot. The system was activated and the components were pumped through the mixing head and into the mold cavity to occupy approximately two thirds of the available volume. (Pumping the entire shot into the mold cavity took approximately one minute.) The temperature of the resin mass in the mold increased without noticeable gas evolution for approximately three minutes after initial mixing until the exothermic temperature reached 95° F. At that point, initiation of the gas evolving reaction was noted and the resin mass began expanding to fill the mold forcing the remaining air from the mold cavity. Pressure in the mold increased to approximately 45 psi while the expanded resin remained in the fluid state until it gelled at 140° F. approximately six minutes after initial mixing. The part, which had a density of about 60 lbs/ft$^3$, was demolded 18 minutes after mixing and examined. The expanded segment below the gel coat had nonporous layers, i.e. "skins," at both surfaces with no voids or gas bubbles.

EXAMPLE B

In this example, a microwave radar feflector was manufactured by resin transfer molding in an apparatus supplied by Venus Corporation, of Kent, Washington. Component A was Reichhold Chemical's 33-072 polyester resin. Components B and C were, respectively, the premixed expansion agent and DDM/9 used in Example A. The mold was prepared by laying in 3 plys of one ounce continuous strand mat, with surface veil mats (resin absorbant material employed to produce a resin rich surface) placed on both surfaces and the mold was closed and clamped. Components A, B and C were prepared and separately provided to the resin transfer molding apparatus. The controller was set to inject the components into the mixing head in a weight ratio of 100:10:3 (Component A:Component B:Component C) in a three pound shot. The system was activated and the components were pumped through the mixing head and into the mold cavity to occupy the available volume in order to produce the high tolerance part without shrinkage. (Pumping the entire shot into the mold cavity took approximately one minute.) The valve in the sprue was closed, and the vents were closed at the first sign of resin leakage. The temperature of the resin mass in the mold increased without noticeable gas evolution for approximately three minutes after initial mixing until the exothermic temperature reached 95° F. At that point, initiation of the gas evolving reaction was noted and the resin mass began expanding. Pressure in the mold increased to approximately 45 psi while the expanded resin remained in the fluid state until it gelled at 140° F. The part, which had a density of about 75 lbs/ft$^3$, demolded 20 minutes after mixing and examined. The part had nonporous layers at both surfaces and showed very little expansion.

OTHER EMBODIMENTS

Other embodiments are within the following claims. For example, the thickness of the skin may be controlled or even eliminated, where desired, by heating the contacting surfaces to induce gas generation further across of the article, or by employing materials less free of water or hydrogen peroxide impurities.

EXAMPLE C

In this example, an eighteen square foot, ¼ inch thick pool liner backer, which does not require a nonporous surface, was produced using resin transfer equipment. Component A was Freeman Chemical's 4105 polyester resin. Component B was the premixed expansion agent employed in Example A. Component C was DSW/9 organic hydroperoxide (MEKP in 50 percent, by weight, solution with 7 percent hydrogen peroxide and 27 percent water as supplied by Lucidol). The mold was opened to receive two plys of 2 oz continuous strand mat (Owen Corning Fibreglass M8610) and the mold was closed and clamped. The controller was set to inject the components into the mixing head in a weight ratio of 100:15:4 (Component A:Component B:Component C) in an eighteen pound shot. The system was activated and the components were pumped through the mixing head and into the mold cavity to occupy approximately one half of the available volume. (Pumping the entire shot into the mold cavity took approximately two minutes.) The temperature of the resin mass in the mold increased without noticeable gas evolution for approximately three minutes after initial mixing until the exothermic temperature reached 95° F. At that point, initiation of the gas evolving reaction was noted and the resin mass began expanding to fill the mold forcing the remaining air from the mold cavity. Pressure in the mold increased to approximately 25 psi while the expanded resin remained in the fluid state until it gelled at 140° F. The part which had a density of about 48 lbs./ft$^3$ was demolded 19 minutes after mixing and examined. Examination of the article revealed that no skins had formed and the surfaces of the article were porous.

EXAMPLE D

The operation of Example C was repeated to produce a second pool liner backer. In this example, however, Component A was Freeman Chemical's XP40-A1173-97 polyester resin with 0.3%, by weight, cobalt napthanate. The weight ratio of Component B was also increased to 20 parts. The system was prepared and activated as in Example C and the mixture was injected into the same mold in a thirteen pound shot. The reaction proceded as before to expand the resin mass to fill the mold cavity under pressure and force out the remaining air. Pressure in the mold increased to approximately 15 psi and the material gelled in the expanded state. The part was demolded after forty-five minutes and had a density of 35.7 lbs/ft$^3$.

The pool parts produced according to the invention in Examples C and D replaced similar nonexpanded parts produced by standard RTM procedures. These replaced parts contained 3 plys of continuous strand mat and weighed 27.8 pounds, with a density of 75 lbs/ft$^3$.

EXAMPLE F

The procedures of Example A above were repeated, but the male mold surface was not gel coated and an equal amount of DSW/9 organic hydroperoxide (MEKP in 50 percent, by weight, solution with 7 percent hydrogen peroxide and 27 percent water as supplied by Lucidol) was employed in place of the DDM/9. The reaction proceeded as above, and the article was demolded after 18 minutes. Examination of the article reveal that no skins had formed and the surfaces of the article were porous and suitable primarily for nonsurface applications.

The surfactant may also be included with the resin in Component A instead of or as well as in Component B with the isocyanate.

I claim:

1. A method of forming a reinforced synthetic article of polyester resin by transfer of a mixture into a closed mold and allowing it to react therein;
   comprising combining a set of reactants to form a mixture which includes
   a major mass of polyester resin in fluid form, at least one polyester cure accelerator, a selected quantity of isocyanate, a surfactant and a promoter,
   said polyester cure accelerator comprising organic hydroperoxide,
   said reactants in said mixture being substantially free of hydrogen peroxide,
   said isocyanate being present in sufficient quantity to react to generate carbon dioxide throughout said mixture to cause said mixture to fill said mold and to prevent shrinkage thereof, and
   said promoter comprising at least one metallic compound,
   placing a reinforcing element within the mold,
   closing said mold,
   transferring the resultant mixture into said closed mold containing said reinforcing element prior to substantial reaction,
   said reactants in said mixture being balanced
      to first cause said metallic promoter compound to react exothermically with at least one component of said set to trigger said isocyanate to react with at least said organic hydroperoxide to evolve said carbon dioxide gas to generate pressure to expand said mixture to fill said mold and bring said fluid resin into pressured wetting contact with substantial regions of the surface of the reinforcement to incorporate said element within said resin by self working within the closed mold,
      and thereafter, after at least about three minutes following the combining of said reactants, to cause a gellation reaction between said cure accelerator and said polyester to gel and solidify said expanded resin, with said reinforcement element incorporated therein, to produce a reinforced expanded article.

2. The method of claim 1 wherein said organic hydroperoxide is methyl ethyl ketone peroxide.

3. The method of claim 1 wherein said metallic promoter compound is exothermically reactive with said isocyanate and said exothermic reaction between said promoter and a portion of said isocyanate produces heat effective to trigger said gas forming reaction.

4. The method of claim 3 wherein said metallic promoter compound is a potassium compound.

5. The method of claim 1 including causing an interior portion of a layer of said resin-containing composition to rise to a higher temperature level than an outer portion of the layer to cause formation of more bubble volume in said interior portion relative to said outer portion prior to said cure whereby a variable apparent density reinforced resin layer is produced having lower apparent density in the region of the interior portion of said layer and higher apparent density in said outer portion while said reinforcement element is encapsulated within said resin.

6. The method of claim 1 wherein the presence of water and hydrogen peroxide in said composition is limited to a weight ratio of the order of 1:25 of said water and hydrogen peroxide to active components in said organic hydroperoxide to thereby cause said gas expansion to form said expanded article with a substantially nonporous exterior surface.

7. The method of claim 4 wherein at least one surface of said expanded article has a Class A finish.

8. A method of forming a synthetic article of polyester resin by transfer of a mixture into a closed mold and allowing it to react therein;

comprising combining a set of reactants to form a mixture which includes
a major mass of polyester resin in fluid form, at least one polyester cure accelerator, a selected quantity of isocyanate, a surfactant and a promoter,
said polyester cure accelerator comprising organic hydroperoxide,
said reactants in said mixture being substantially free of hydrogen peroxide,
said isocyanate being present in sufficient quantity to react to generate carbon dioxide throughout said mixture to cause said mixture to fill said mold and to prevent shrinkage thereof, and
said promoter comprising at least one metallic compound, transferring the resultant mixture into a closed mold prior to substantial reaction, said reactants in said mixture being balanced
to first cause said metallic promoter compound to react exothermically with at least one component of said set to trigger said isocyanate to react with at least said organic hydroperoxide to evolve said carbon dioxide gas to generate pressure to expand said mixture to fill said mold,
and thereafter, after at least about three minutes following the combining of said reactants, to cause a gellation reaction between said cure accelerator and said polyester to gel and solidify said expanded resin to produce an expanded article.

* * * * *

UNITED STATES PATENT AND TRADEMARK OFFICE
CERTIFICATE OF CORRECTION

PATENT NO. : 4,405,538
DATED : September 20, 1983
INVENTOR(S) : Glen W. Saidla

It is certified that error appears in the above-identified patent and that said Letters Patent are hereby corrected as shown below:

Column 3, Line 38, "means" should be -mass-.

Column 4, Line 25, "resistance" should be -resistant-.

Column 4, Line 54, "out" should be -about-

Column 4, Line 64, "at" should be -of-.

Column 6, Line 1, "but" should be -with-.

Column 6, (Table I), Line 36, "of" should be -by-.

Column 8, Line 30, "pount" should be -pound-.

Column 8, Line 53, "feflector" should be -reflector-.

Column 9, Line 65, "XP40-A1173-97" should be -XP40-A173-97-

Signed and Sealed this

Twenty-second Day of May 1984

[SEAL]

Attest:

GERALD J. MOSSINGHOFF

Attesting Officer    Commissioner of Patents and Trademarks